United States Patent [19]

Sanderson

[11] Patent Number: 5,671,839
[45] Date of Patent: Sep. 30, 1997

[54] OPEN WEB

[75] Inventor: Jeffrey John Sanderson, Tayside, United Kingdom

[73] Assignee: Reekie Manufacturing Limited, Tayside, United Kingdom

[21] Appl. No.: 522,368
[22] PCT Filed: Mar. 16, 1994
[86] PCT No.: PCT/GB94/00520
   § 371 Date: Sep. 18, 1995
   § 102(e) Date: Sep. 18, 1995
[87] PCT Pub. No.: WO94/21108
   PCT Pub. Date: Sep. 29, 1994

[30] Foreign Application Priority Data

Mar. 19, 1993 [GB] United Kingdom ............ 9305681

[51] Int. Cl.⁶ .................................................. B65G 15/54
[52] U.S. Cl. .................................. 198/848; 198/846
[58] Field of Search ........................... 198/817, 846, 198/848, 849

[56] References Cited

U.S. PATENT DOCUMENTS

| 774,560 | 11/1904 | Carlson | 198/846 |
|---|---|---|---|
| 2,324,171 | 7/1943 | Paradise | 198/846 X |
| 2,906,395 | 9/1959 | Greer | 198/846 |
| 3,015,381 | 1/1962 | Mohwinkel | 198/203 |
| 5,168,981 | 12/1992 | Ruff | 198/850 |

FOREIGN PATENT DOCUMENTS

| 0162204 | 3/1985 | European Pat. Off. . | |
|---|---|---|---|
| 0162002 | 11/1985 | European Pat. Off. . | |
| 0340514 | 4/1989 | European Pat. Off. . | |
| 818925 | 10/1951 | Germany . | |
| 1084984 | 7/1960 | Germany . | |
| 3246529 | 6/1984 | Germany . | |
| 3246530 | 6/1984 | Germany . | |
| 3406335 | 8/1985 | Germany | 198/848 |
| 265541 | 3/1989 | Germany . | |
| 3905758 | 8/1990 | Germany . | |
| 0855820 | 12/1960 | United Kingdom . | |
| 1018271 | 2/1962 | United Kingdom . | |
| 975635 | 11/1964 | United Kingdom . | |
| 1276666 | 12/1972 | United Kingdom . | |
| 2009686 | 6/1979 | United Kingdom . | |
| 1581488 | 12/1980 | United Kingdom . | |
| 2161779 | 1/1986 | United Kingdom . | |
| 2237255 | 5/1991 | United Kingdom . | |

*Primary Examiner*—James R. Bidwell
*Attorney, Agent, or Firm*—Young & Basile, P.C.

[57] ABSTRACT

The present invention relates to an open web (10) suitable for use in conveying and separating bodies such as root crops and stone sand clods. The web (10) comprises at least two elongate belts (11) extending parallel to each other in substantially spaced apart relation, and a plurality of rods (12) mounted in parallel spaced apart relation across the belts (11) with connecting portions (13) of the rods (12) secured to the belts (11). The connecting portions (13) are substantially embedded within the body of the belts (11) and secured thereto by bonding the belts (11) to the connecting portions (13).

9 Claims, 3 Drawing Sheets

OPEN WEB

BACKGROUND OF THE INVENTION

The present invention relates to open webs of the type often referred to as continental webs, which are widely used in agricultural machinery for conveying and cleaning root crops and other farm produce, stone and clode separation etc.

Conventional webs 1, as shown in FIG. 1, generally comprise a plurality of rods or bars 2 mounted in parallel spaced apart relation across two or more parallel spaced apart belts 3. The rods 2 are of rounded section which is flattened 4 at connecting portions 5 which are provided with holes 6 through which extend rivets 7 which also pass through the belts 3 and clamping plates 8 so as to secure the rods 2 to the belts 3.

The above described form of construction is however plagued with numerous weaknesses which result in relatively poor web reliability. Thus for example breakages frequently occur at the junctions between the rounded and flattened parts of the bar, and within the flattened portions at the rivet holes, and the rivets themselves also lose their heads and/or break between their ends. The assembly of the rods and belts and riveting together thereof is relatively cumbersome and labour intensive. In addition the riveting process is susceptible to inaccurate positioning of the rivets and thereby the rods which results in incorrect spacing of the rods. This in turn leads to crop loss through over-sized inter-rod gaps, as well as strain on the rod-web interconnection at the under-sized inter-rod gaps where the rods tend to be forced apart by the drive sprocket teeth which engage the bars to drive the web, thereby also increasing the risk of premature failure. Having regard to the dramatically increased intensity in the use of agricultural machinery with very large areas of land having to be harvested or cleared of stones and clods, in a short period of time, it will be appreciated that any down-time at all resulting from the abovementioned kind of failures can have serious economic consequences to the farmer or contractor.

It is an object of the present invention to avoid or minimize one of more of the above disadvantages.

The present invention provides an open web suitable for use in conveying and separating bodies such as root crops and stones and clods, which web comprises at least two elongate belts extending parallel to each other in substantially spaced apart relation, and a plurality of rods mounted in parallel spaced apart relation across said belts with connecting portions of said rods secured to said belts, characterized in that said connecting portions are substantially embedded within the body of said belts and secured thereto by bonding of said belts to said connecting portions.

In another aspect the present invention provides a method of manufacture of an open web suitable for use in conveying and separating bodies such as root crops and stones and clods, which method comprises supporting a plurality of elongate rods in regular spaced apart parallel relation in an elongate array and moulding at least two flexible elongate belts so as to extend in parallel spaced apart relation transversely of said rods and around connecting portions of said rods so as to embed said connecting portions within said belts and bond them securely to said belts.

SUMMARY OF THE INVENTION

In a preferred aspect the present invention provides a method of manufacture of an open web suitable for use in conveying and separating bodies such as root crops and stones and clods, which method comprises the steps of:

providing a plurality of elongate rods;

providing at least two elongate trough belt moulds with rod locating means for positioning the rods in regular spaced apart part parallel relation in an elongate array, with connecting portions of the rods supported within the moulds above the base thereof and below a predetermined fill level thereof;

introducing fluid uncured polymeric material into said moulds up to said predetermined fill level;

curing said polymeric material so as to form elongate belts of polymeric material in which are embedded and securely bonded the connecting portions of said rods; and removing said belts from said moulds.

Thus the present invention provides a simple and economic method of reliably securing the rods to the belt in an open web using plain e.g. cylindrical section rods without the need for processing or machining of the rods and cumbersome procedures such as riveting. The improved working life and resistance to failure of the open webs of the invention leads moreover to significantly increased operational efficiency for users thereof.

Advantageously the belts have included therein one or more reinforcing layers e.g. of woven textile material such as nylon or polyalkene e.g. polypropylene, or glass fibre etc. Steel mesh reinforcing layers may also be used. Desirably any such reinforcement layer has an open weave or open mesh in the range of from 40% to 80% preferably 60%. Various polymeric materials may be used in the belt including rubber and polyurethane. Curing may be carried out in any suitable manner known in the art such as baking at a temperature not less than the curing temperature of the polymeric material for a sufficient period of time.

Further preferred features and advantages of the present invention will appear from the following detailed description given by way of example of some preferred embodiments illustrated with reference to the accompanying drawings in which.

Figure 1:
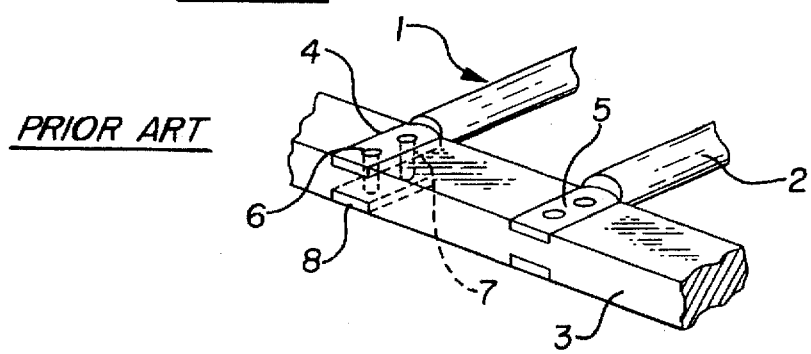
FIG. 1 is a general perspective view of part of a conventional open web.
Figure 2:
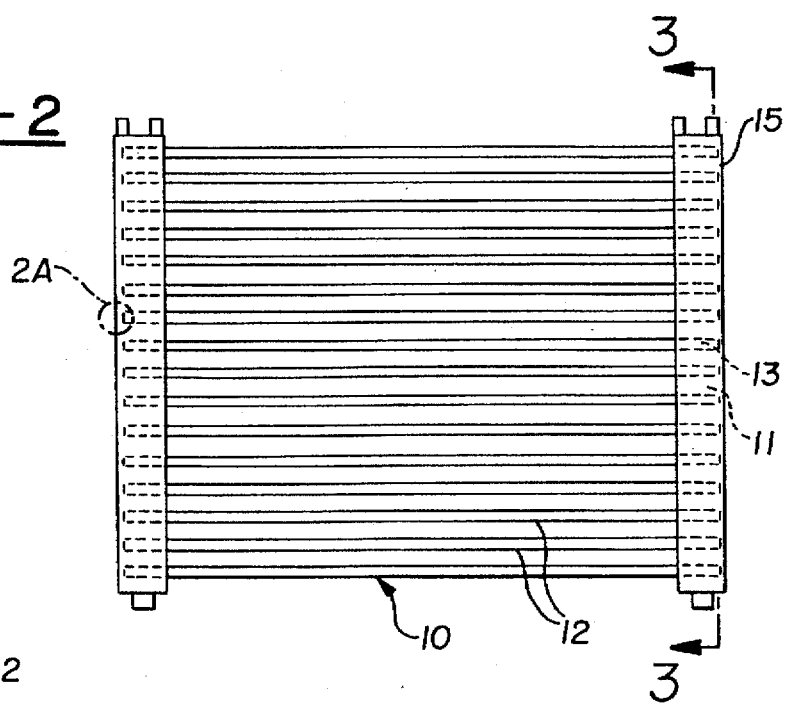
FIG. 2 is a plan view of part of an open web of the present invention.
Figure 2A:
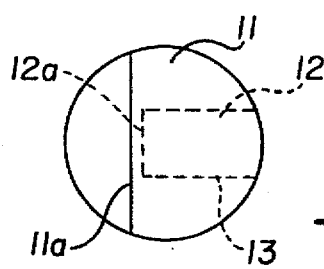
FIG. 2A is a detail of a portion of the web as indicated in FIG. 2.

FIG. 2 shows an open web 10 suitable for use in a potato harvester (not shown) comprising two elongate belts 11 extending parallel to each other and a large plurality of rods 12 mounted in regular parallel spaced apart relation. Opposite end portions 13 of the rods 12 are embedded inside respective ones of the two elongate belts 11 which are made of polyurethane and reinforced with three polyamide webbing tapes 14. As shown in the detail view FIG. 2A, the end faces 12a of the rods 12 are set back slightly from the outer sides 11a of the belts 11 so that the end portions 13 of the rods are fully enclosed thereby minimizing the risk of damage to crops or to the machinery from sharp corners and edges on the ends of the rods. In order to reduce the risk of damage to the belts 11, these may also conveniently have included therein a steel mesh layer 19 or the like just below the outer face 20 of the belt 11 in order to provide a barrier to sharp-edged stones or the like cutting into the belt 11.

At each end 15 of the belts 11 are used rods 16 which have hinge lugs 17 secured thereto which are secured together with a connecting rod 18 similar to the other rods 12, 16, thereby to join the ends of the belts 11 and thereby the open web, together.

Figure 4:
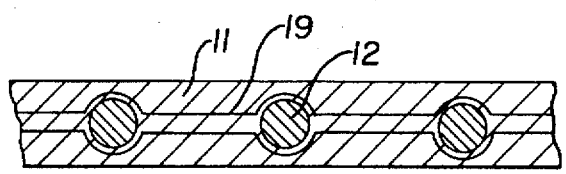
FIGS. 4–9 show cross-sectional side elevations of a variety of other embodiments of an open web of the present invention.

In more detail and with reference to FIGS. 4–7, it will be seen that the belt 11 may be reinforced with the reinforcement layer 19 in a variety of ways. FIG. 4 shows two parallel spaced apart reinforcement layers 19 running along the centre of the belt 11, each reinforcement layer wrapping around the rods 12.

DETAILED DESCRIPTION OF THE DRAWINGS

Figure 5:
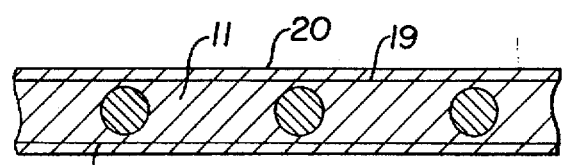

FIG. 5 shows two parallel spaced apart reinforcement layers 19, each layer 19 being just below the outer surface 20 of the belt 11.

Figure 6:
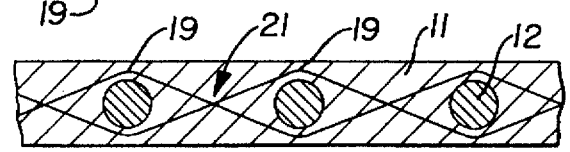

FIG. 6 shows two zig-zag shaped layers 19 which overlap at a point 21 in the centre of the belt 11 between every two adjacent rods 12.

Figure 7:
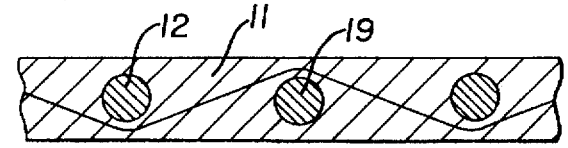

FIG. 7 shows a single zig-zag shaped layer similar to that in FIG. 6.

Figure 8:
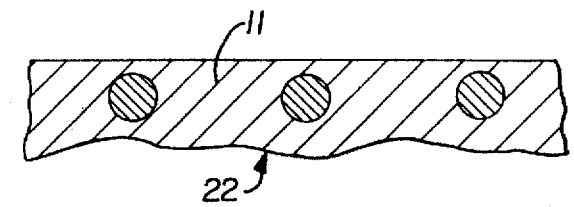

FIG. 8 shows a belt 11 having a corrugated underside 22 formed and arranged to provide agitation to the open web as it passes over rollers (not shown) on a potato harvester (not shown).

Figure 9:
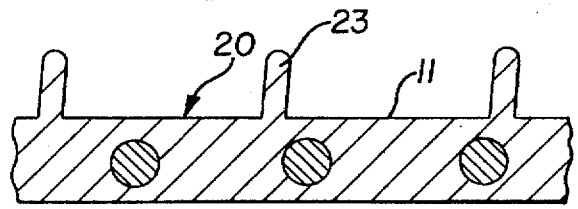
Figure 10:
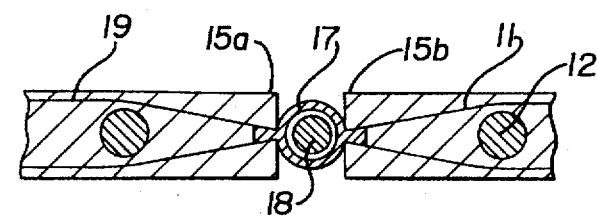
FIGS. 10–14 show cross-sectional side elevations of a variety of belt connecting means of the open web of the present invention.
Figure 11:
Figure 12:
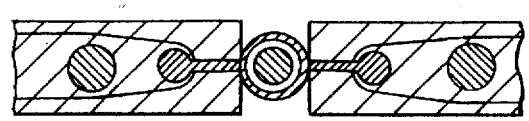

FIG. 9 shows a further type of belt 11 having upstanding flights 23 moulded onto the top side 20 of the belt 11 for holding potatoes (or the like) or for deflecting potatoes (or the like) away from the side of the open web 10.

Figure 3:
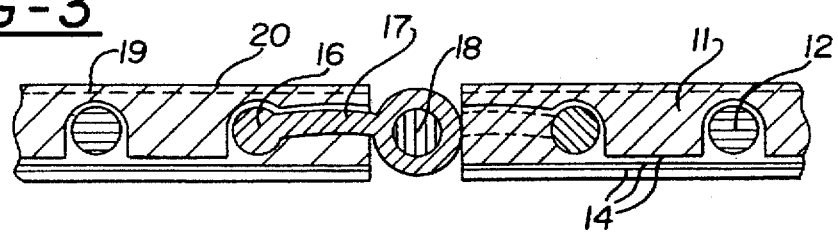
FIG. 3 is a detail cross-sectional side elevation of part of the web of FIG. 2.
Figure 13:
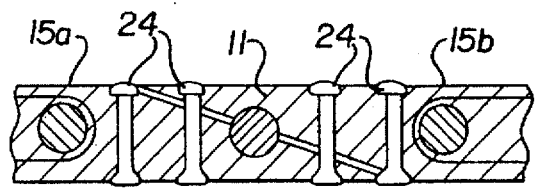

FIGS. 10 to 14 show a variety of means of joining together the ends 15a, b of the belt 11 and are generally similar to that described above and with reference to FIG. 3. The embodiment shown in FIG. 13 shows the two end 15 a, b portions of a belt 11 bolted 24 together to form an endless belt.

Figure 14:
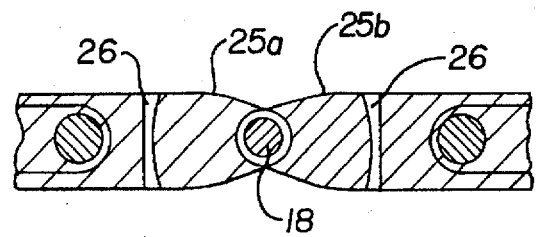
Figure 16:
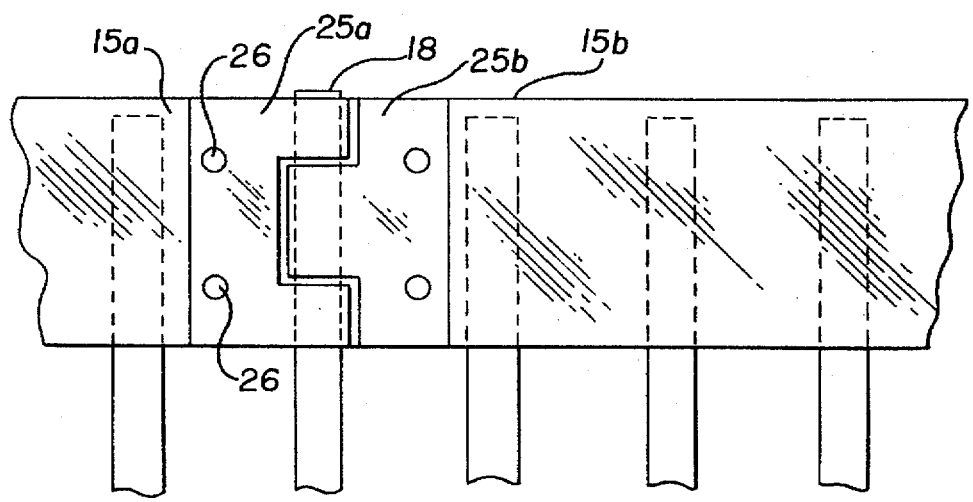
FIG. 16 is a partial plan view of a belt connecting means of the present invention.

FIG. 14 shows a belt 11 having connector portions 25a, b riveted 26 respectively to the ends 15a, b of a belt 11. The connector portions 25a, b are generally in the form of a hinge portions with a connector rod 18 defining the pivot and joining together the ends. FIG. 16 shows in plan view the embodiment of FIG. 14.

Figure 15:
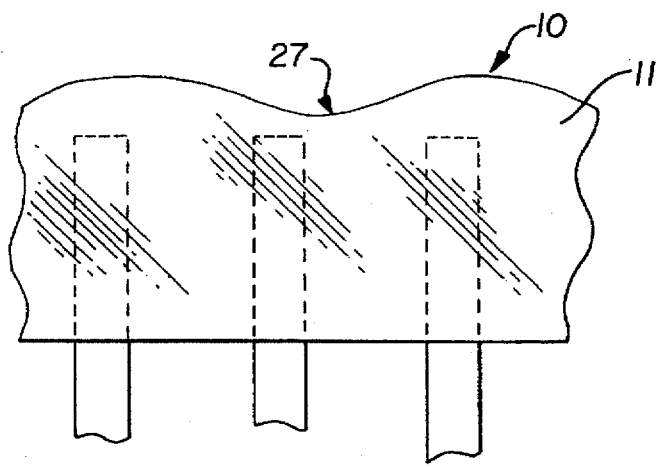
FIG. 15 is a partial plan view of a second embodiment of the elongate belt of an open web of the present invention.

FIG. 15 shows in plan view a belt 11 having a corrugated side 27 formed and arranged to engage and run against a roller (not shown) on the side of, for example a potato harvester, to agitate the open web 10 in a sideway direction.

DESCRIPTION OF PREFERRED EMBODIMENTS

It will be appreciated that various modifications may be made to the above-described embodiment without departing from the scope of the present invention. Thus, for example, instead of having a length of web whose ends are hingedly connected together, the belts 11 could be made as continuous closed loops by the use of suitable loop form moulds. In this case it will be appreciated that it may be preferred to support the rods vertically rather horizontally and/or to use fully enclosed mould using composite or multi-part moulds.

It will also be understood that various sizes and configurations of webs may be made in accordance with the present invention. Thus in general the rods will have a diameter in the range from 8 to 13 mm whilst commonly used web pitches are in the range from 25 to 60 mm e.g. 28 mm, 36 mm, 42 mm, 45 mm, and 50 mm depending on the user's application e.g. whether it is desired to retain small potatoes when harvesting. With traditional forms of web construction, agricultural machinery manufacturers and suppliers need to hold significant stocks of all the different sizes that might be required which results in significant costs. A further benefit of the present invention is that by using a moulding apparatus with a plurality of interchangeable locating means formed and arranged for positioning the rods at different pitches within the moulds, different types of open web can be quickly and easily produced as required thereby reducing the need for extensive stockholding of made-up webs.

Yet a further modification that may be made to the above described embodiment without departing from the scope of the present invention is the provision of dowel pins formed and arranged for passing through holes in the ends of the rods and which rods are then moulded into the belts, the dowel pins preventing the rods from coming loose and/or rotating in the belt.

I claim:

1. An open web for conveying and separating agricultural products and the like comprising:
   a. a plurality of regularly spaced parallel rods of rigid material and uniform length; and
   b. a pair of spaced apart parallel elastomeric belts, said rods extending between and joined to said elastomeric belts to form a unified structure;

said belts and said unified structure being fabricated by:
   (i) prelocating said rods in spaced parallel relationship and, thereafter;
   (ii) molding said belts around and in enclosing relationship to respective opposite ends of said rods to secure and bond the elastomeric material of the belts to said rods.

2. An open web as defined in claim 1 wherein the rods are metal and of uniform cross section throughout their length.

3. An open web as defined in claim 2 wherein the cross section of said rods is round.

4. An open web as defined in claim 1 wherein the belts are fabricated of polymeric material.

5. An open web as defined in claim 4 wherein the polymeric material of the belts is reinforced.

6. An open web as defined in claim 1 further including hinged connector means joining the ends of said molded belts.

7. A method of manufacturing an open web suitable for use in conveying and separating agricultural products and the like comprising the steps of
   a. supporting a plurality of metal rods of uniform cross section throughout their length in parallel spaced relationship; and
   b. molding at least two flexible elongate belts so as to extend in parallel spaced apart relationship transversely of said rods and to create a unified structure wherein the rod ends are embedded in and bonded to the material of said belts in said molding step.

8. A method as defined in claim 7 wherein the rods are of round cross section.

9. A method as defined in claim 7 including the further step of introducing a reinforcing material proximate said rod ends and molding the belts around the reinforcing material and the rod ends to create a unified and reinforced structure.

* * * * *